United States Patent
Igasaki

(10) Patent No.: US 9,904,261 B2
(45) Date of Patent: Feb. 27, 2018

(54) DRIVE CONTROLLER, DRIVING SYSTEM, AND DRIVE CONTROL METHOD

(71) Applicant: MITUTOYO CORPORATION, Kawasaki-shi, Kanagawa (JP)

(72) Inventor: Shiro Igasaki, Kawasaki (JP)

(73) Assignee: MITUTOYO CORPORATION, Kawasaki-Shi (JP)

(*) Notice: Subject to any disclaimer, the term of this patent is extended or adjusted under 35 U.S.C. 154(b) by 576 days.

(21) Appl. No.: 14/599,790

(22) Filed: Jan. 19, 2015

(65) Prior Publication Data
US 2015/0205277 A1  Jul. 23, 2015

(30) Foreign Application Priority Data
Jan. 22, 2014 (JP) ................................ 2014-009891

(51) Int. Cl.
| G01M 1/38 | (2006.01) |
| G05B 15/02 | (2006.01) |
| G05B 19/404 | (2006.01) |

(52) U.S. Cl.
CPC ........... G05B 15/02 (2013.01); G05B 19/404 (2013.01)

(58) Field of Classification Search
None
See application file for complete search history.

(56) References Cited

U.S. PATENT DOCUMENTS

| 2006/0161274 A1* | 7/2006 | Ishikawa ............... G05B 19/19 700/63 |
| 2008/0092893 A1* | 4/2008 | Boyle ..................... H02P 6/17 128/204.21 |
| 2009/0234498 A1* | 9/2009 | Takahashi ............ G03G 15/0131 700/230 |
| 2010/0066086 A1* | 3/2010 | Ko .......................... F03D 7/0224 290/44 |

(Continued)

FOREIGN PATENT DOCUMENTS

| JP | 59-189401 | 10/1984 |
| JP | 62-203203 | 9/1987 |

(Continued)

OTHER PUBLICATIONS

Japanese Office Action dated Aug. 29, 2017, English translation included, 5 pages.

*Primary Examiner* — Adam Lee
(74) *Attorney, Agent, or Firm* — Rankin, Hill & Clark LLP

(57) ABSTRACT

A drive controller includes a speed compensation unit that performs a speed compensation for an object based on a result of comparison made by a speed comparator that compares a current speed of the drive object with a speed indicated by a speed command. The speed compensation unit includes a position-information-based speed gain setting unit that sets a position-information-based variable gain based on position-information-based speed gain information representing a relationship between a position of the object and position-information-based variable gain that varies (Continued)

depending on a load torque of the motor when the object is present at a predetermined position, and a speed compensation processor that performs a speed compensation based on a result of the comparison in the speed comparator and the position-information-based variable gain set by the position-information-based speed gain setting unit.

8 Claims, 7 Drawing Sheets

(56) References Cited

U.S. PATENT DOCUMENTS

| | | | | |
|---|---|---|---|---|
| 2012/0194121 | A1* | 8/2012 | Miyaji | G05B 19/404 318/615 |
| 2014/0300308 | A1* | 10/2014 | Ikeda | G05B 19/00 318/561 |
| 2015/0045940 | A1* | 2/2015 | Takeuchi | G05B 13/0205 700/159 |

FOREIGN PATENT DOCUMENTS

| | | |
|---|---|---|
| JP | 2006-202019 | 8/2006 |
| JP | 2011-231490 | 11/2011 |

* cited by examiner

MOTOR ELECTRIC CURRENT AT A CONSTANT SPEED

DRIVE CONTROLLER, DRIVING SYSTEM, AND DRIVE CONTROL METHOD

The entire disclosure of Japanese Patent Application No. 2014-009891 filed Jan. 22, 2014 is expressly incorporated herein by reference herein.

TECHNICAL FIELD

The present invention relates to a drive controller, driving system, and drive control method.

BACKGROUND ART

Machine tools, carrying machines, coordinate measuring machines, image measuring machines and the like employ a mechanism for controlling a position and a speed of an object to be moved. In such a mechanism, when acceleration of the object rapidly changes, vibration is sometimes caused to the object. Studies have been made for solving the above disadvantages (see, for instance, Patent Literature 1: JPA-2006-202019).

The structure disclosed in Patent Literature 1 includes an acceleration sensor provided to an object.

When the object is to be moved by a motor, a speed command is calculated based on a position command and a position feedback signal. Further, acceleration of the object is detected and a correction value is calculated based on the detected acceleration. Then, after a corrected speed command is calculated by subtracting the correction value from the speed command, a current command is calculated based on the corrected speed command and a speed feedback signal. Subsequently, a command to the motor is calculated based on the current command and a current feedback signal, and the object is moved by the motor based on the calculated command.

In the structure as disclosed in Patent Literature 1, even when the acceleration of the object does not change, the load torque of the motor may vary depending on the speed and the position of the object. However, according to the structure disclosed in Patent Literature 1, the motor cannot be controlled in response to the variation in the load torque, so that a speed control performance for the object becomes unstable.

SUMMARY OF THE INVENTION

An object of the invention is to provide a drive controller, driving system and drive control method capable of stabilizing a speed control performance for an object irrespective of a variation in a load torque depending on a position or a speed of the object.

A drive controller according to an aspect of the invention controls a drive unit for driving an object in accordance with a predetermined speed command, the drive controller including: a speed comparator that compares a current speed of the object with a speed indicated by the speed command; a speed compensator that performs a speed compensation for the object based on a comparison result by the speed comparator; and a current supply unit that controls the drive unit based on a speed compensation result by the speed compensator, in which the speed compensator comprises: a position-information-based speed gain storage that stores position-information-based speed gain information representing a relationship between a position of the object and a variable gain that varies depending on a load torque of the drive unit when the object is present at a predetermined position; a variable gain setting unit that sets the variable gain corresponding to a current position of the object based on the position-information-based speed gain information; and a compensation processor that performs the speed compensation based on a comparison result by the speed comparator and the variable gain set by the variable gain setting unit.

According to the above aspect of the invention, even when the load torque of the drive unit varies depending on the position of the object, the drive unit can be controlled based on the variable gain in accordance with the magnitude of the load torque, so that the speed control performance for the object can be stabilized.

It should be noted that the factor for varying the load torque of the drive unit depending on the position of the object is exemplified by an elastic force applied by a spring, rubber and the like, dents and projections generated on a slider and/or a guide that moves the object, external force such as magnetic force and wind force, and frictional force between the drive unit and other object(s).

In the drive controller according to the above aspect of the invention, it is preferable that the speed compensator includes a position-information-based speed gain information generator that generates the position-information-based speed gain information, the current supply unit includes a power converter that acquires the speed compensation result as a current command and supplies an electric current to the drive unit based on the acquired current command, and the position-information-based speed gain information generator generates the position-information-based speed gain information based on a relationship between an electric current supplied to the drive unit and the position of the object when the speed compensation is performed so that the object is moved at a constant speed.

According to the above arrangement, even when the drive unit to be controlled by the drive controller and/or the object to be driven are replaced, the drive controller can generate the position-information-based speed gain information depending on the drive unit to be controlled and/or the object to be driven. Accordingly, irrespective of the type of the drive unit and the object, the speed control performance for the object can be stabilized.

Further, in an arrangement where the speed feedback control for performing the speed compensation in accordance with the current speed of the object is performed so that the object is moved at a constant speed, the supplied electric current varies depending on the load torque of the drive unit when the object is present at the predetermined position. The drive controller can generate the position-information-based speed gain information with a simple process of using the above relationship.

In the drive controller according to the above aspect of the invention, it is preferable that the speed compensation unit includes a speed-information-based speed gain storage that stores speed-information-based speed gain information representing a relationship between the speed of the object and the variable gain that varies depending on the load torque of the drive unit when the object is moved at the predetermined speed, and the variable gain setting unit sets the variable gain corresponding to the current speed of the object based on the speed-information-based speed gain information.

According to the above arrangement, even when the load torque of the drive unit varies depending on the position and the speed of the object, the drive unit can be controlled based on the variable gain in accordance with the magnitude of the load torque, so that the speed control performance for the object can be stabilized.

A drive controller according to another aspect of the invention controls a drive unit for driving an object in accordance with a predetermined speed command, the drive controller including: a speed comparator that compares a current speed of the object with a speed indicated by the speed command; a speed compensator that performs a speed compensation for the object based on a comparison result by the speed comparator; and a current supply unit that controls the drive unit based on a speed compensation result by the speed compensator, in which the speed compensator includes: a speed-information-based speed gain storage that stores speed-information-based speed gain information representing a relationship between a speed of the object and a variable gain that varies depending on a load torque of the drive unit when the object is moved at a predetermined speed; a variable gain setting unit that sets the variable gain corresponding to a current speed of the object based on the speed-information-based speed gain information; and a compensation processor that performs the speed compensation based on a comparison result by the speed comparator and the variable gain set by the variable gain setting unit.

According to the above aspect of the invention, even when the load torque of the drive unit varies depending on the speed of the object, the drive unit can be controlled based on the variable gain in accordance with the magnitude of the load torque, so that the speed control performance for the object can be stabilized.

In the drive controller according to the above aspect of the invention, it is preferable that the speed compensator includes a speed-information-based speed gain information generator that generates the speed-information-based speed gain information, the current supply unit comprises a power converter that acquires the speed compensation result as a current command and supplies an electric current to the drive unit based on the acquired current command, and the speed-information-based speed gain information generator generates the speed-information-based speed gain information based on a relationship between a first electric current supplied to the drive unit when the speed compensation is performed so that the object is moved at a first speed, and a second electric current supplied to the drive unit when the speed compensation is performed so that the object is moved at a second speed.

According to the above arrangement, the speed-information-based speed gain information depending on the drive unit to be controlled and/or the object to be driven can be generated by the drive controller, so that the speed control performance for the object can be stabilized irrespective of the type of the drive unit and the object.

Further, in an arrangement where the speed feedback control is performed so that the object is moved at a constant speed, the supplied electric current varies depending on the load torque of the drive unit when the object is moved at the predetermined speed. The drive controller can generate the speed-information-based speed gain information with a simple process of using the above relationship.

A driving system according to still another aspect of the invention includes a drive unit that moves an object; and the drive controller according to the above aspect(s) that controls the drive unit in accordance with the predetermined speed command.

According to the above aspect of the invention, a drive unit that is capable of stabilizing the speed control performance for the object can be provided.

A drive control method according to a further aspect of the invention controls a drive unit for driving an object in accordance with a predetermined speed command, the drive control method including: storing, in a position-information-based speed gain storage, position-information-based speed gain information representing a relationship between a position of the object and a variable gain that varies depending on a load torque of the drive unit when the object is present at a predetermined position; comparing a current speed of the object with a speed indicated by the speed command; setting the variable gain corresponding to a current position of the object based on the position-information-based speed gain information; compensating the speed of the object based on a result of the comparison of the current speed of the object with the speed indicated by the speed command, and the variable gain set in the variable gain setting step; and controlling the drive unit based on a result of the speed compensation in the speed comparing step.

A drive control method according to still further aspect of the invention controls a drive unit for driving an object in accordance with a predetermined speed command, the drive control method including: storing, in a speed-information-based speed gain storage, speed-information-based speed gain information representing a relationship between a speed of the object and a variable gain that varies depending on a load torque of the drive unit when the object is moved at a predetermined speed; comparing a current speed of the object with a speed indicated by the speed command; setting the variable gain corresponding to a current speed of the object based on the speed-information-based speed gain information; compensating the speed of the object based on a result of the comparison of the current speed of the object with the speed indicated by the speed command, and the variable gain set in the variable gain setting step; and controlling the drive unit based on a result of the speed compensation in the speed comparing step.

According to the drive control methods in the above aspects of the invention, similar to the above drive controller, even when the load torque of the drive unit varies depending on the position and the speed of the object, the drive unit can be controlled based on the variable gain in accordance with the magnitude of the load torque, so that the speed control performance for the object can be stabilized.

BRIEF DESCRIPTION OF DRAWING(S)

FIG. 1 schematically shows a driving system according to an exemplary embodiment of the invention.

DESCRIPTION OF EMBODIMENT(S)

Structure of Driving System

Figure 1:
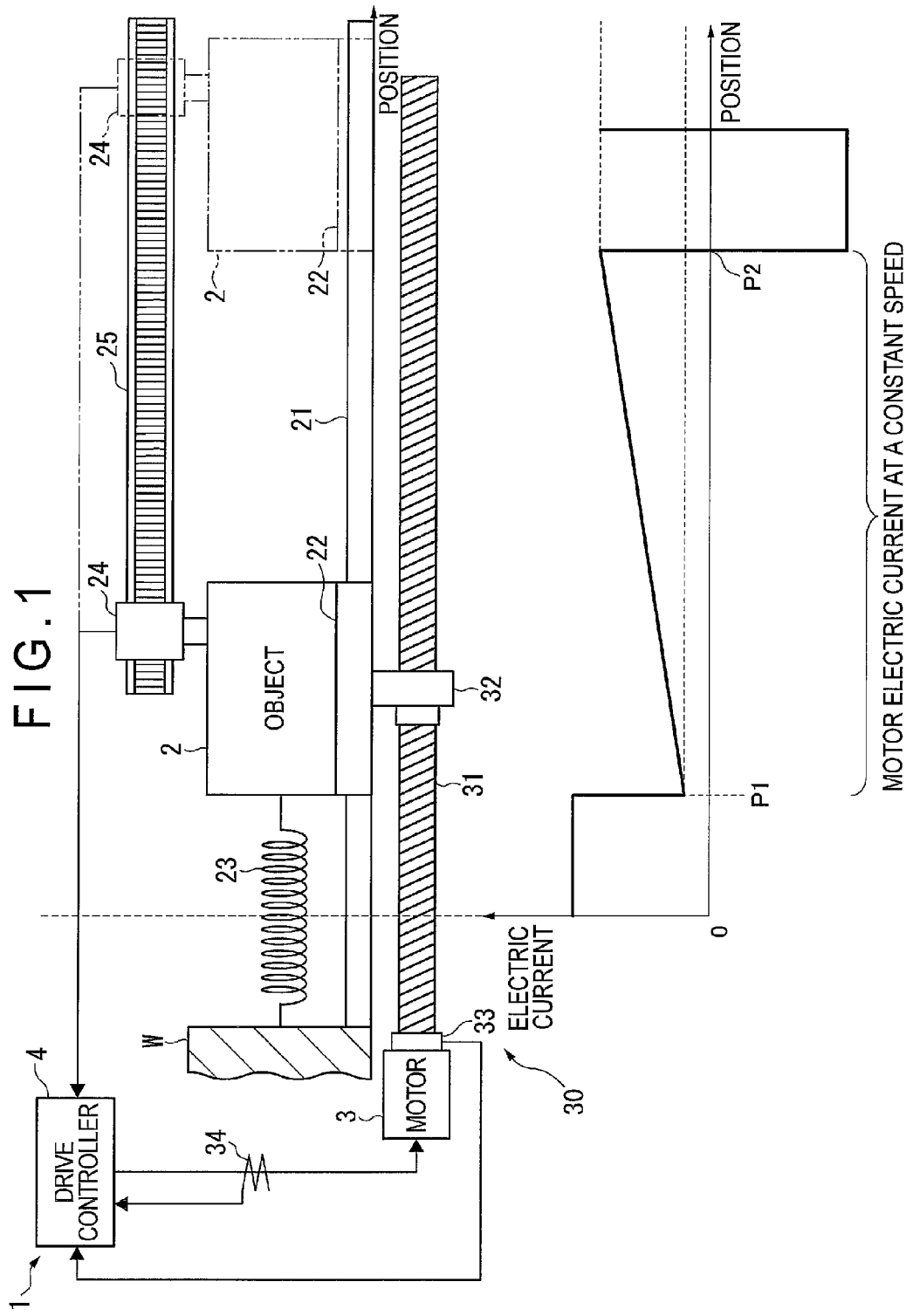

As shown in FIG. 1, a driving system 1 according to an exemplary embodiment of the invention includes: a motor 3 (a drive unit) for driving an object 2; and a drive controller 4 that controls the motor 3 based on a predetermined speed command.

The object 2 is provided to a slider 22 movable along a guide 21. The object 2 is connected to a wall W via a spring 23.

A readhead 24 is provided to the object 2. The readhead 24 reads a value on a scale 25 provided along the guide 21 and outputs the read value to the drive controller 4 in a form of a position signal of the object 2.

The motor 3 is driven by an electric current from the drive controller 4. A current sensor 34 is provided in a supply path of the electric current. The current sensor 34 detects the electric current flowing from the drive controller 4 and outputs an analog current signal to the drive controller 4.

The motor 3 forms a part of a feed mechanism 30 for moving the object 2 toward and away from the wall W.

The feed mechanism 30 includes a feed screw 31 that is rotated by the motor 3, a feed screw nut 32 provided to a lower side of the slider 22 and an encoder 33 that detects a rotary angle of the feed screw 31. The encoder 33 outputs a detected rotary angle signal of the feed screw 31 to the drive controller 4.

Figure 2:
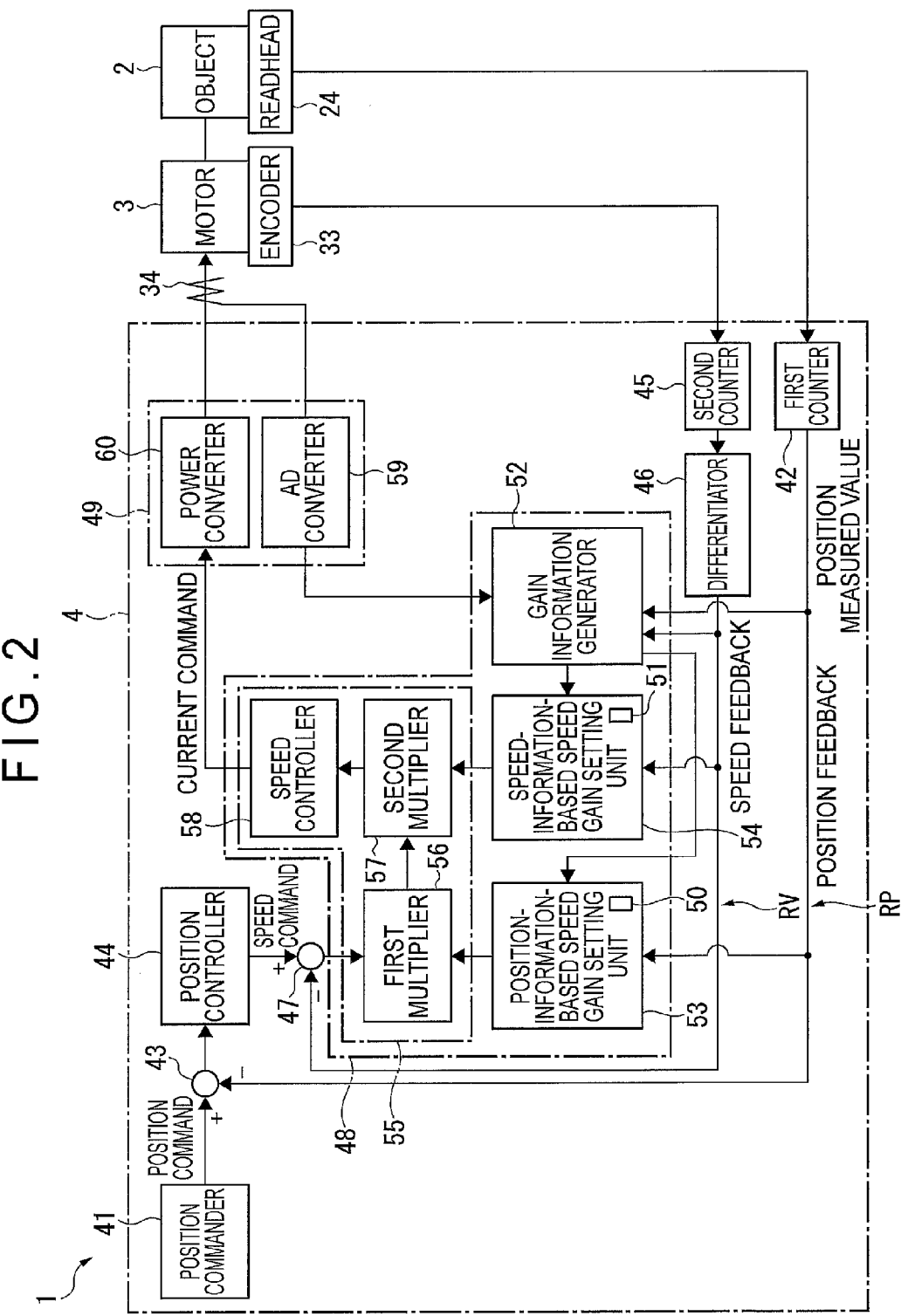
FIG. 2 is a block diagram showing the driving system.

As shown in FIG. 2, the drive controller 4 includes: a position commander 41; a first counter 42; a position comparator 43; a position controller 44; a second counter 45; a differentiator 46; a speed comparator 47; a speed compensator 48; and a current supply unit 49.

The position commander 41 outputs a position command for moving the object 2 to a predetermined position.

The first counter 42 counts the signal from the readhead 24 and outputs the count as a current position of the object 2 (position feedback).

The position comparator 43 calculates a deviation between the position indicated by the position command issued from the position commander 41 and the current position of the object 2 received from the first counter 42 and outputs the results of the calculation.

The position controller 44 outputs the deviation calculated by the position comparator 43 as a speed command.

The second counter 45 counts the signal from the encoder 33 and outputs the count as a current rotary angle of the encoder 33.

The differentiator 46 differentiates the rotary angle received from the second counter 45 and outputs the differentiated value as a current speed of the object 2 (speed feedback).

The speed comparator 47 calculates a deviation between the speed indicated by the command issued from the position controller 44 and the current speed of the object 2 received from the differentiator 46 and outputs the calculated result.

The speed compensator 48 performs a speed compensation for the object 2 based on the calculation result of the speed comparator 47. The speed compensator 48 includes: a position-information-based speed gain storage 50; a speed-information-based speed gain storage 51; a gain information generator 52 (a position-information-based speed gain information generator and a speed-information-based speed gain information generator); a position-information-based speed gain setting unit 53 (a variable gain setting unit); a speed-information-based speed gain setting unit 54 (a variable gain setting unit); and a speed compensation processor 55 (a compensation processor).

The position-information-based speed gain storage 50 stores position-information-based speed gain information representing a relationship between the position of the object 2 and a position-information-based variable gain Kvp (i.e. a variable gain varying depending on the load torque of the motor 3 when the object 2 is present at a predetermined position).

The speed-information-based speed gain storage 51 stores speed-information-based speed gain information representing a relationship between the speed of the object 2 and a speed-information-based variable gain Kvv (i.e. a variable gain varying depending on the load torque of the motor 3 when the object 2 is moved at a predetermined speed).

The gain information generator 52 generates the position-information-based speed gain information and the speed-information-based speed gain information and stores them respectively in the position-information-based speed gain storage 50 and the speed-information-based speed gain storage 51.

The details and generation process of the position-information-based speed gain information and the speed-information-based speed gain information will be described later.

The position-information-based speed gain setting unit 53 sets the position-information-based variable gain Kvp corresponding to the current position of the object 2 received from the first counter 42 based on the position-information-based speed gain information stored in the position-information-based speed gain storage 50.

The speed-information-based speed gain setting unit 54 sets the speed-information-based variable gain Kvv corresponding to the current speed of the object 2 received from the differentiator 46 based on the speed-information-based speed gain information stored in the speed-information-based speed gain storage 51.

The speed compensation processor 55 performs the speed compensation for the object 2 based on the calculation results in the speed comparator 47, the gain set by the position-information-based speed gain setting unit 53 and the gain set by the speed-information-based speed gain setting unit 54. The speed compensation processor 55 includes a first multiplier 56, a second multiplier 57 and a speed controller 58.

The first multiplier 56 multiplies the calculation result in the speed comparator 47 by the gain outputted by the position-information-based speed gain setting unit 53, and outputs the multiplication result to the second multiplier 57.

The second multiplier 57 multiplies the multiplication result in the first multiplier 56 by the gain outputted by the speed-information-based speed gain setting unit 54, and outputs the multiplication result to the speed controller 58.

The speed controller 58 outputs a supply current for driving the object 2 as a current command.

The current supply unit 49 controls the motor 3 based on the results of the speed compensation by the speed compensator 48. The current supply unit 49 includes an AD converter 59 and a power converter 60.

The AD converter 59 converts the current signal from the current sensor 34 from analog to digital and outputs the converted signal as a current electric current flowing in the motor 3.

The power converter 60 applies the electric current to the motor 3 based on the current command (results of the speed compensation).

Then, the position comparator 43, position controller 44, speed comparator 47, first multiplier 56, second multiplier 57, speed controller 58, power converter 60, motor 3, readhead 24, and first counter 42 define a position control loop RP for driving the motor 3 so that the position feedback from the first counter 42 coincides with the position indicated by the position command issued from the position commander 41.

Further, the speed comparator 47, first multiplier 56, second multiplier 57, speed controller 58, power converter 60, motor 3, encoder 33, second counter 45, and differentiator 46 define a speed control loop RV for driving the motor 3 so that the speed feedback from the differentiator 46 coincides with the speed indicated by the speed command issued from the position controller 44.

The power converter 60 applies the electric current to the motor 3 so that the electric current coincides with the electric current indicated by the current command issued from the speed controller 58.

Operation of Driving System

Next, an operation of the driving system 1 will be described below.

Initially, when the motor 3 for driving the object 2 is connected to the drive controller 4, the drive controller 4 generates the position-information-based speed gain information and the speed-information-based speed gain information.

Generation of Speed-Information-Based Speed Gain Information

When the gain information generator 52 of the drive controller 4 generates the speed-information-based speed gain information, the gain information generator 52 controls the position-information-based speed gain setting unit 53 and the speed-information-based speed gain setting unit 54 so that a gain of "1" is set.

Subsequently, the drive controller 4 performs the position feedback control and the speed feedback control on the motor 3 so that the object 2 is moved at a constant speed (a first speed V1) within a movable range of the object 2. At this time, the position feedback from the first counter 42 is inputted into the position comparator 43 and the position-information-based speed gain setting unit 53. When the position feedback is received from the first counter 42, the position-information-based speed gain setting unit 53 sets the gain at "1" irrespective of the current position of the object 2 and outputs the gain to the first multiplier 56. Additionally, the speed feedback from the differentiator 46 is inputted to the speed comparator 47 and the speed-information-based speed gain setting unit 54. When the speed feedback from differentiator 46 is received, the speed-information-based speed gain setting unit 54 sets the gain at "1" irrespective of the current speed of the object 2 and outputs the gain to the second multiplier 57. As a result, the calculation result of the speed deviation outputted from the speed comparator 47 is multiplied by "1" at the first multiplier 56 and the second multiplier 57 and is outputted to the speed controller 58. In other words, the calculation result of the speed comparator 47 is outputted to the speed controller 58 without being modified.

Figure 3:
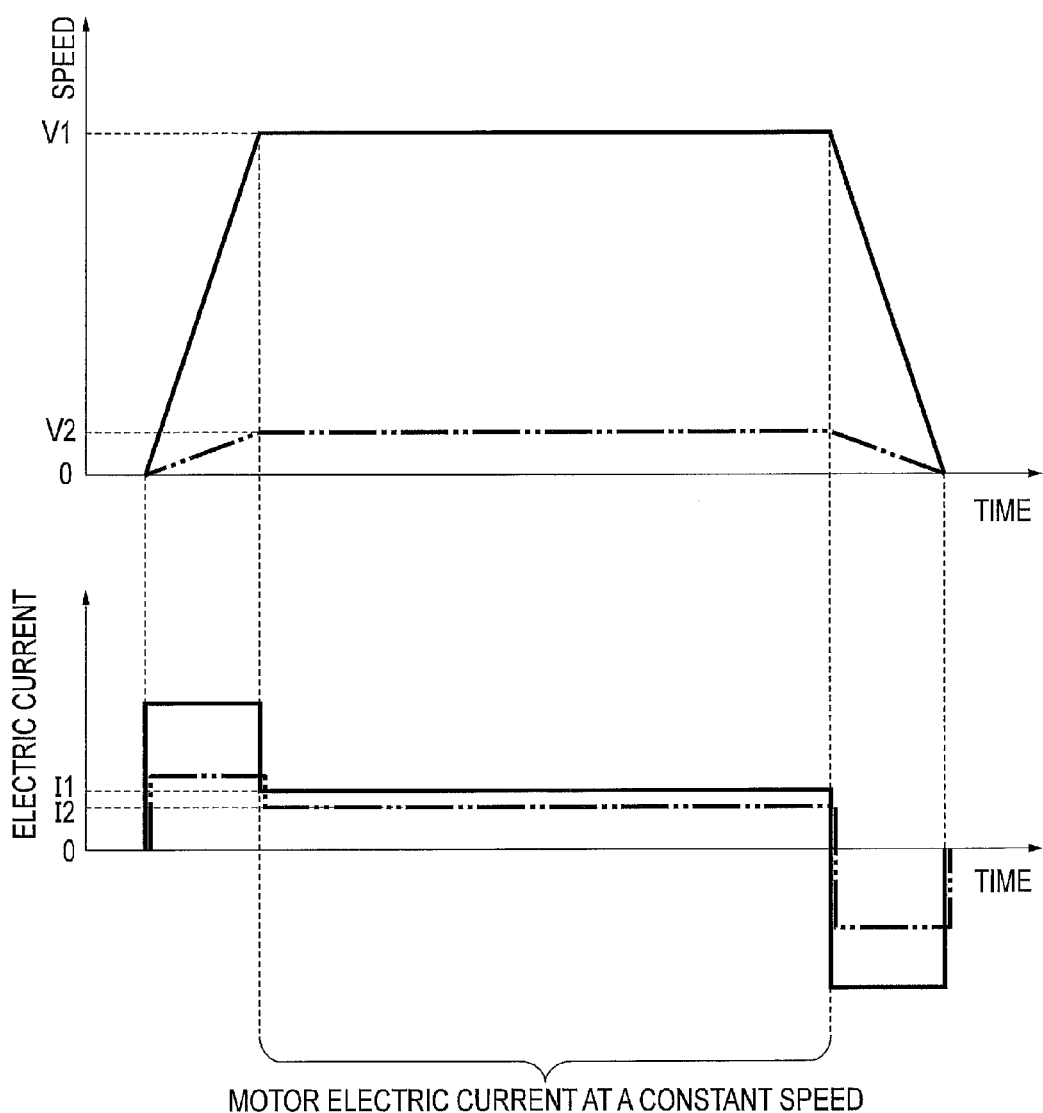
FIG. 3 is a graph showing a relationship between an elapsed time while generating speed-information-based speed gain information in the driving system, and a speed of an object and an electric current supplied to the motor.

In accordance with the above control process, as shown in a solid line in FIG. 3, an electric current higher than a plus first current I1 is applied to the motor 3 until the speed of the object 2 is raised from 0 to the first speed V1. Then, when the speed of the object 2 reaches the first speed V1, the first current I1 is applied to the motor 3 in order to keep the first speed V1. When the speed of the object 2 is lowered to 0, a predetermined minus electric current is applied.

Subsequently, the drive controller 4 performs the position feedback control and the speed feedback control on the motor 3 so that the object 2 is moved at a constant speed (a second speed V2 lower than the first speed V1) within the movable range of the object 2.

In accordance with the above control process, as shown in a two-dot dashed line in FIG. 3, when the speed of the object 2 is raised from 0 to reach the second speed V2, a plus second current I2 is applied in order to keep the second speed V2. When the speed of the object 2 is to be reduced to 0, a predetermined minus electric current is applied.

Figure 4:
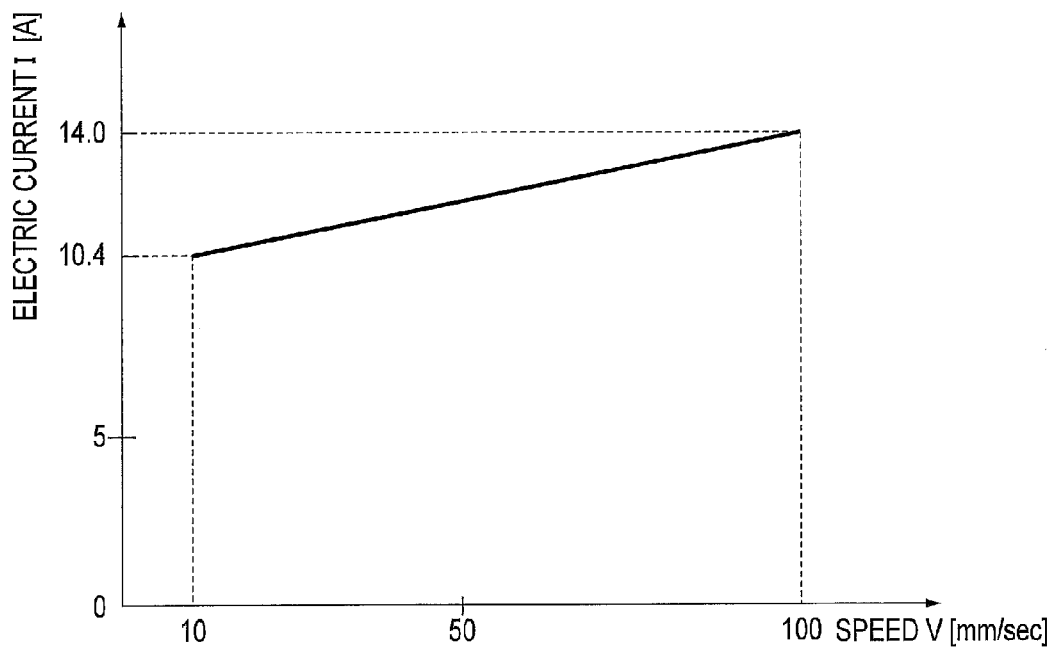
FIG. 4 is a graph showing a relationship between the speed of the object while generating the speed-information-based speed gain information, and the electric current supplied to the motor.

Then, the gain information generator 52 obtains a relationship between the electric current applied to the motor 3 and the speed of the object 2 as shown in the solid line and two-dot dashed line in FIG. 3. For instance, supposing that: the first current I1 applied to the motor 3 when the first speed V1 of the object 2 is 100 mm/sec is 14.0 A (ampere); and the second current I2 applied to the motor 3 when the second speed V2 of the object 2 is 10 mm/sec is 10.4 A, the gain information generator 52 can obtain a graph representing a relationship as shown in FIG. 4.

Figure 5:
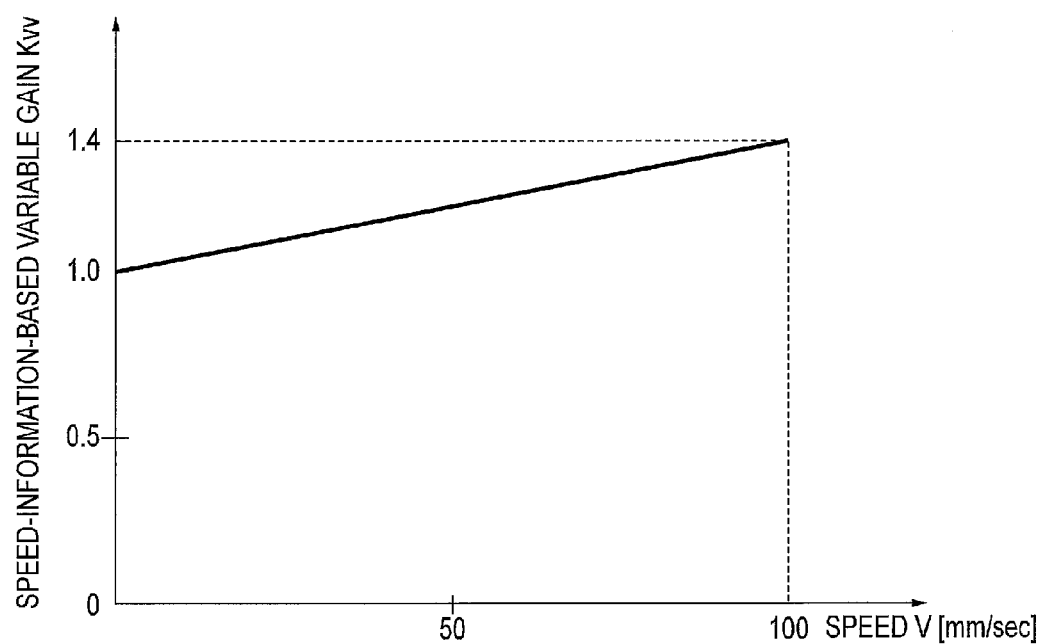
FIG. 5 is a graph showing the speed-information-based speed gain information.

Subsequently, the gain information generator 52 performs, based on an inclination (change rate) of the graph shown in FIG. 4, a normalization for setting the speed-information-based variable gain Kvv at 1 when the speed of the object 2 is 0, and generates a graph as shown in FIG. 5 as speed-information-based speed gain information. It should be noted that the normalization may alternatively be performed so that, when the speed of the object 2 is 0, the speed-information-based variable gain Kvv becomes a value exceeding 1 or a value less than 1. Then, the gain information generator 52 stores the speed-information-based speed gain information in the speed-information-based speed gain storage 51.

As indicated by the speed-information-based speed gain information, the speed-information-based variable gain Kvv is set large in accordance with the increase in the load torque of the motor 3 as the speed of the object 2 increases.

It should be noted that the speed-information-based speed gain information may be in a form of the graph as shown in FIG. 5 or, alternatively, in a form of a formula or a table representing the graph.

Further, when, for instance, the electric current applied to the motor 3 is not constant in order to move the object 2 at a constant speed of the first speed V1, an average electric current while the object 2 is moved at the first speed V1 may be used as the first current I1 in order to generate the speed-information-based speed gain information.

Generation of Position-Information-Based Speed Gain Information

When the gain information generator 52 of the drive controller 4 generates the position-information-based speed gain information, the gain information generator 52 controls the position-information-based speed gain setting unit 53 and the speed-information-based speed gain setting unit 54 so that a gain of "1" is set in the same manner as when the speed-information-based speed gain information is to be generated.

Subsequently, the drive controller 4 performs the position feedback control and the speed feedback control on the motor 3 so that the object 2 is moved at a predetermined constant speed within the movable range of the object 2. At this time, similarly to the generation of the speed-information-based speed gain information, the calculation result of the speed comparator 47 is outputted to the speed controller 58 without being modified.

Figure 6:
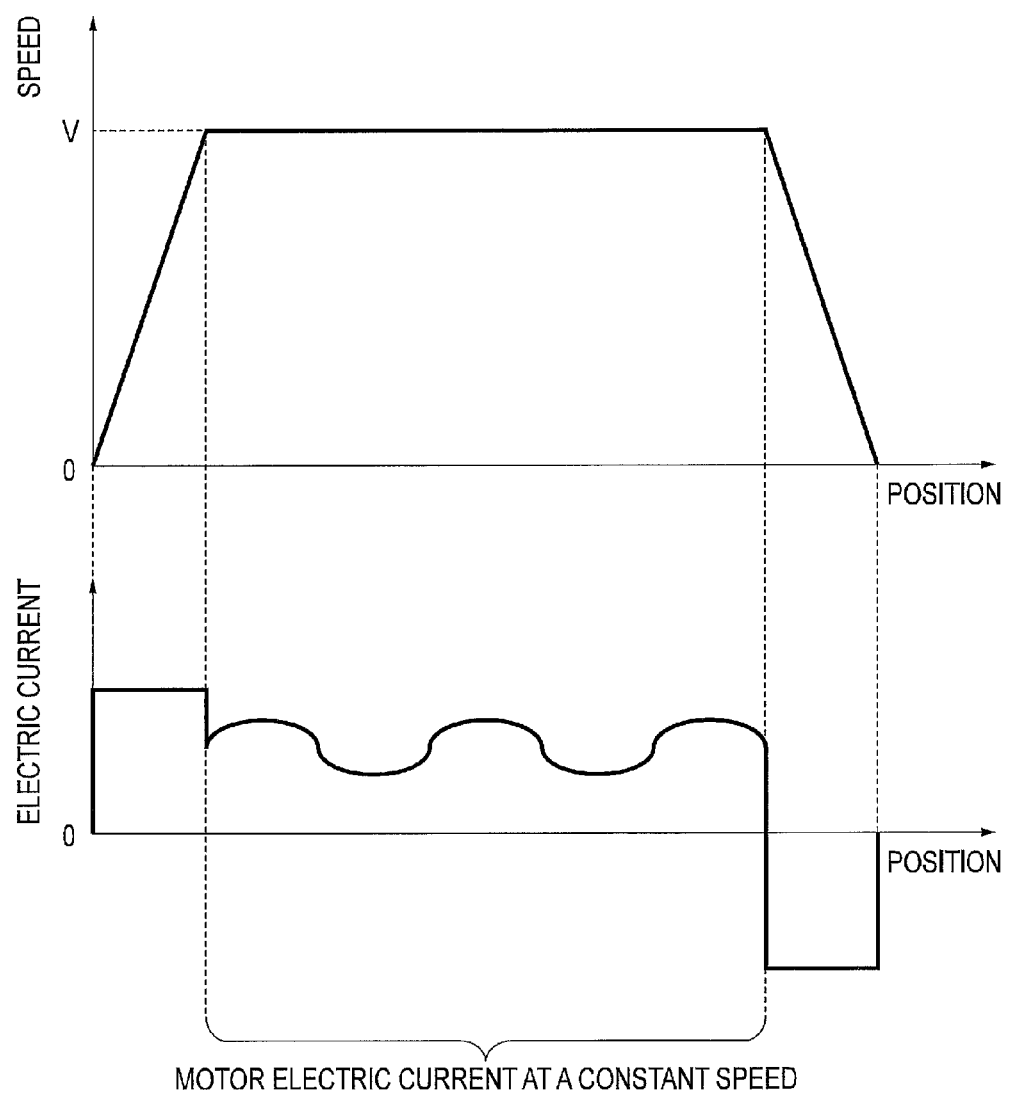
FIG. 6 is a graph showing a relationship between a position of the object while generating position-information-based speed gain information in the driving system, and the speed of the object and the electric current supplied to the motor.

In accordance with the above control process, until the speed of the object 2 is raised from 0 to the predetermined speed V, a predetermined plus electric current is applied to the motor 3, as shown in FIG. 6. When the speed of the object 2 reaches the predetermined speed V, a plus electric current is applied to the motor 3 in order to keep the predetermined speed V. When the speed of the object 2 is to be reduced to 0, a predetermined minus electric current is applied to the motor 3.

When the load torque of the motor 3 varies depending on the position of the object 2, in order to control the object 2 to be driven at the predetermined speed V, since a high electric current is applied to the motor 3 when the load torque of the motor 3 is large and a low electric current is applied to the motor 3 when the load torque of the motor 3 is small, the electric current applied to the motor 3 varies as shown in FIG. 6 in accordance with the variation in the load torque.

Figure 7:
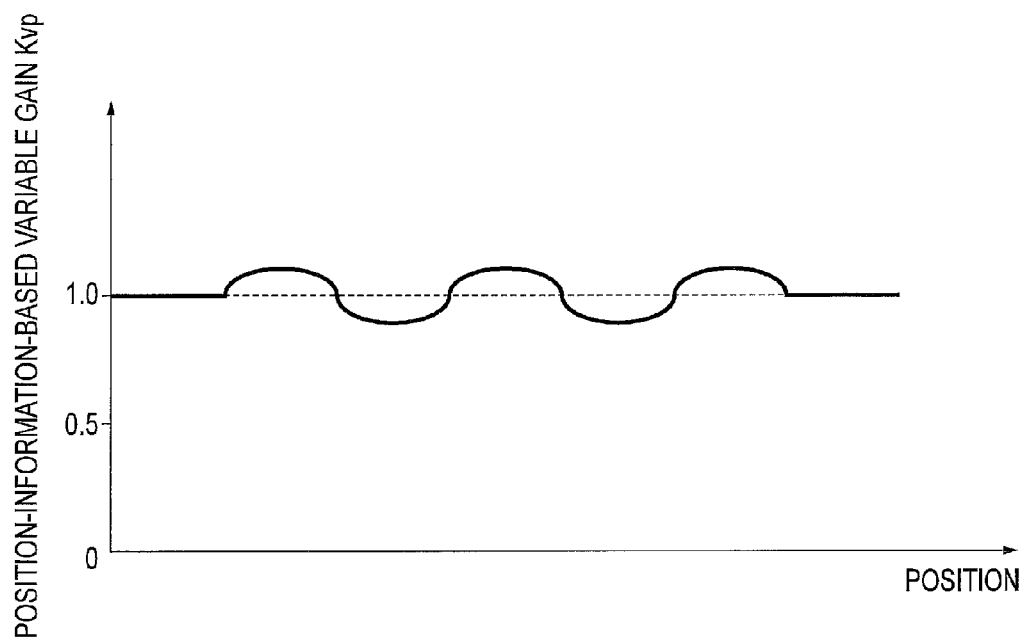
FIG. 7 is a graph showing the position-information-based speed gain information.

Then, the gain information generator 52 calculates an average value of the electric current when the object 2 is moved at the predetermined constant speed V, and performs a normalization for setting the position-information-based variable gain Kvp at 1 when the electric current of the average value is applied to the motor 3, thereby generating a graph as shown in FIG. 7 as position-information-based speed gain information. It should be noted that the normalization process may be performed so that the position-information-based variable gain Kvp is set at 1 when a maximum or minimum electric current is applied to the motor 3 instead of the average value electric current. Then, the gain information generator 52 stores the position-information-based speed gain information in the position-information-based speed gain storage 50.

As indicated by the position-information-based speed gain information, the position-information-based variable gain Kvp is set in accordance with the variation in the load torque of the motor 3 depending on the position of the object 2.

It should be noted that the position-information-based speed gain information may be in a form of the graph as shown in FIG. 7 or, alternatively, in a form of a formula or a table representing the graph.

Control of Motor

When the position-information-based speed gain information and the speed-information-based speed gain information are respectively stored in the position-information-based speed gain storage 50 and the speed-information-based speed gain storage 51, the drive controller 4 controls the motor 3 based on the position command issued by the position commander 41.

Specifically, the gain information generator 52 of the drive controller 4 controls the position-information-based speed gain setting unit 53 and the speed-information-based speed gain setting unit 54 so as to respectively set the position-information-based variable gain Kvp and the speed-information-based variable gain Kvv based on the position-information-based speed gain information and the speed-information-based speed gain information.

Subsequently, the drive controller 4 performs the position feedback control and the speed feedback control on the motor 3 based on the position command issued by the position commander 41.

When the position feedback from the first counter 42 is inputted to the position comparator 43 and the position-information-based speed gain setting unit 53, the position-information-based speed gain setting unit 53 sets the position-information-based variable gain Kvp corresponding to the current position of the object 2 based on the position-information-based speed gain information as shown in FIG. 7, and outputs the set position-information-based variable gain Kvp to the first multiplier 56. When the speed feedback from the differentiator 46 is inputted to the speed comparator 47 and the speed-information-based speed gain setting unit 54, the speed-information-based speed gain setting unit 54 sets the speed-information-based variable gain Kvv corresponding to the current speed of the object 2 based on the speed-information-based speed gain information as shown in FIG. 5, and outputs the set speed-information-based variable gain Kvv to the second multiplier 57.

Then, in the speed control loop RV, the first multiplier 56 multiplies the calculation result of the speed deviation outputted from the speed comparator 47 by the position-information-based variable gain Kvp, and outputs the multiplication result to the second multiplier 57. The second multiplier 57 multiplies the multiplication result outputted from the first multiplier 56 by the speed-information-based variable gain Kvv, and outputs the multiplication result to the speed controller 58. In the speed control loop RV, the speed controller 58 sets the supply electric current and drives the motor 3 with the supply electric current at a corresponding speed.

Since the control process is performed using the position-information-based variable gain Kvp and the speed-information-based variable gain Kvv, even when the load torque of the motor 3 varies depending on the position and the speed of the object 2, the speed control performance for the object 2 can be stabilized. For instance, even when the object 2 requires greater load torque of the motor 3 due to the resilient force of the spring 23 as the object 2 moves away from the wall W as shown in FIG. 1, the object 2 can be moved from a position P1 to a position P2 at a constant speed with a stable speed control performance through the control using the position-information-based variable gain Kvp and the speed-information-based variable gain Kvv.

Advantage(s) of Exemplary Embodiment(s)

According to the above exemplary embodiment, even when the load torque of the motor 3 varies depending on the position and the speed of the object 2, the motor 3 can be controlled based on the position-information-based variable gain Kvp and the speed-information-based variable gain Kvv in accordance with the magnitude of the load torque. Accordingly, the speed of the object 2 can be stably controlled in either case where the object 2 is moved at a constant speed irrespective of the position thereof or where the object 2 is moved at different speeds depending on the position thereof.

Further, even when the motor 3 and/or the object 2 is replaced, the drive controller 4 can generate the position-information-based speed gain information and the speed-information-based speed gain information corresponding to the replaced component. Accordingly, the speed of the object 2 can be stably controlled irrespective of the type of the motor 3 and the object 2. Further, with a simple process using the variation in the supply electric current to the motor 3 depending on the position and the speed of the object 2 when a feedback control for driving the object 2 at a constant speed is performed, the drive controller 4 can generate the position-information-based speed gain information and the speed-information-based speed gain information.

Modification(s)

It should be understood that the scope of the present invention is not limited to the above-described exemplary embodiment(s) but includes modifications and improvements as long as the modifications and improvements are compatible with the invention.

For instance, the motor 3 may be controlled based solely on the position-information-based variable gain Kvp without providing the speed-information-based speed gain storage 51, the speed-information-based speed gain setting unit 54 and the second multiplier 57 to the drive controller 4. Alternatively, the motor 3 may be controlled based solely on the speed-information-based variable gain Kvv without providing the position-information-based speed gain storage 50, the position-information-based speed gain setting unit 53 and the first multiplier 56.

Further, without providing the gain information generator 52 to the drive controller 4, the position-information-based speed gain information and the speed-information-based speed gain information may be generated through simulations, experiments and the like in an external machine and may be stored in the position-information-based speed gain storage 50 and the speed-information-based speed gain storage 51.

Further, the drive controller 4 may generate the position-information-based speed gain information and the speed-information-based speed gain information using the relationship between the variation in the supply electric current to the motor 3 depending on the position and the speed of the object 2.

Further, though the feedback control is performed so that the object 2 is moved at constant speed of two levels when the speed-information-based speed gain information is to be generated, the feedback control may be performed so that the object 2 is moved at constant speed of three or more levels.

An object to be controlled by the drive controller of the invention may be moved in at least one of horizontal direction and vertical direction by a drive unit.

Further, the drive unit of the invention may move the object in any manner (e.g. linearly, in a curved manner and in spiral).

What is claimed is:

1. A drive controller that controls a drive unit for driving an object to be driven in accordance with a predetermined speed command, the drive controller comprising:
    a speed comparator that compares a current speed of the object with a speed indicated by the predetermined speed command;
    a speed compensator that performs a speed compensation for the object; and
    a current supply unit that controls the drive unit based on the speed compensation performed by the speed compensator, wherein the current supply unit comprises a power converter that acquires the speed compensation as a current command and supplies an electric current to the drive unit based on the acquired current command, and wherein the speed compensator comprises:
    a position-information-based speed gain storage that stores position-information-based speed gain information representing a relationship between a position of the object and a variable gain that varies depending on a load torque of the drive unit when the object is present at a predetermined position;
    a variable gain setting unit that sets the variable gain corresponding to a current position of the object based on the position-information-based speed gain information;
    a compensation processor that performs the speed compensation based on the comparison made by the speed comparator and the variable gain set by the variable gain setting unit; and
    a position-information-based speed gain information generator that generates the position-information-based speed gain information,
    wherein the position-information-based speed gain information generator generates the position-information-based speed gain information based on a relationship between the electric current supplied to the drive unit while the object is moved at a constant speed and the position of the object while the object is moved at the constant speed.

2. The drive controller according to claim 1, wherein the speed compensator comprises a speed-information-based speed gain storage that stores speed-information-based speed gain information representing a relationship between the speed of the object and the variable gain that varies depending on the load torque of the drive unit when the object is moved at the predetermined speed, and
    the variable gain setting unit sets the variable gain corresponding to the current speed of the object based on the speed-information-based speed gain information.

3. The drive controller according to claim 2, wherein the speed compensator comprises a speed-information-based speed gain information generator that generates the speed-information-based speed gain information, and
    the speed-information-based speed gain information generator generates the speed-information-based speed gain information based on a relationship between a first electric current supplied to the drive unit when the speed compensation is performed so that the object is moved at a first speed and a second electric current different than the first electric current supplied to the drive unit when the speed compensation is performed so that the object is moved at a second speed different than the first speed.

4. A drive controller that controls a drive unit for driving an object to be driven in accordance with a predetermined speed command, the drive controller comprising:
    a speed comparator that compares a current speed of the object with a speed indicated by the predetermined speed command;
    a speed compensator that performs a speed compensation for the object; and
    a current supply unit that controls the drive unit based on the speed compensation performed by the speed compensator wherein the current supply unit comprises a power converter that acquires the speed compensation as a current command and supplies an electric current to the drive unit based on the acquired current command, and wherein the speed compensator comprises:
    a speed-information-based speed gain storage that stores speed-information-based speed gain information representing a relationship between a speed of the object and a variable gain that varies depending on a load torque of the drive unit when the object is moved at a predetermined speed;
    a variable gain setting unit that sets the variable gain corresponding to a current speed of the object based on the speed-information-based speed gain information;

a compensation processor that performs the speed compensation based on the comparison made by the speed comparator and the variable gain set by the variable gain setting unit; and a speed-information-based speed gain information generator that generates the speed-information-based speed gain information, wherein the speed-information-based speed gain information generator generates the speed-information-based speed gain information based on a relationship between a first electric current supplied to the drive unit when the speed compensation is performed so that the object is moved at a first speed and a second electric current different than the first electric current supplied to the drive unit when the speed compensation is performed so that the object is moved at a second speed different than the first speed.

5. A driving system comprising:

a drive unit that moves an object; and the drive controller according to claim 1 that controls the drive unit.

6. A driving system comprising:

a drive unit that moves an object; and the drive controller according to claim 4 that controls the drive unit.

7. A drive control method of controlling a drive unit for driving an object in accordance with a predetermined speed command, the drive control method comprising:

generating position-information-based speed gain information based on a relationship between an electric current supplied to the drive unit while the object is moved at a constant speed and the position of the object while the object is moved at the constant speed, wherein the position-information-based speed gain information represents a relationship between a position of the object and a variable gain that varies depending on a load torque of the drive unit when the object is present at a predetermined position;

storing the position-information-based speed gain information in a position-information-based speed gain storage;

comparing a current speed of the object with a speed indicated by the predetermined speed command;

setting the variable gain corresponding to a current position of the object based on the position-information-based speed gain information;

compensating the speed of the object based on a result of the comparison of the current speed of the object with the speed indicated by the predetermined speed command and the variable gain set in the variable gain setting step; and controlling the drive unit based on a result of the speed compensation in the speed compensation step.

8. A drive control method of controlling a drive unit for driving an object in accordance with a predetermined speed command, the drive control method comprising:

generating speed-information-based speed gain information based on a relationship between a first electric current supplied to the drive unit when a speed compensation is performed so that the object is moved at a first speed and a second electric current different than the first electric current supplied to the drive unit when the speed compensation is performed so that the object is moved at a second speed different than the first speed, wherein the speed-information-based speed gain information represents a relationship between a speed of the object and a variable gain that varies depending on a load torque of the drive unit when the object is moved at a predetermined speed;

storing the speed-information-based speed gain information in a speed-information-based speed gain storage;

comparing a current speed of the object with a speed indicated by the predetermined speed command;

setting the variable gain corresponding to a current speed of the object based on the speed-information-based speed gain information;

compensating the speed of the object based on a result of the comparison of the current speed of the object with the speed indicated by the predetermined speed command and the variable gain set in the variable gain setting step; and controlling the drive unit based on a result of the speed compensation in the speed compensation step.

* * * * *